Nov. 29, 1960 H. SMITH ET AL 2,961,702
MOLDING APPARATUS FOR PNEUMATIC TIRES
Filed July 16, 1957
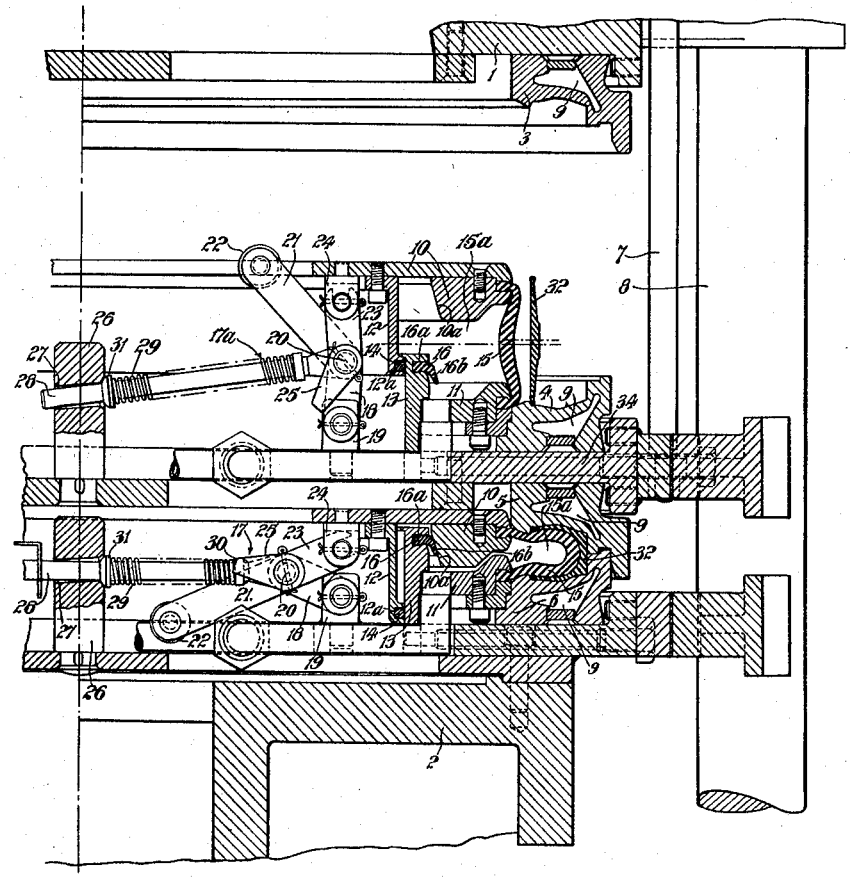
INVENTORS
Harold Smith
Donald Jesse Barber
by Benj. T. Barber
their attorney

United States Patent Office 2,961,702
Patented Nov. 29, 1960

2,961,702

MOLDING APPARATUS FOR PNEUMATIC TIRES

Harold Smith, Sutton, Coldfield, and Ronald Jesse Barber, Erdington, Birmingham, England, assignors to Dunlop Tire and Rubber Corporation, Buffalo, N.Y., a corporation of New York Filed July 16, 1957, Ser. No. 672,189

9 Claims. (Cl. 18—17)

Our invention relates to apparatus for molding pneumatic tires.

In known apparatus for molding pneumatic tires or pneumatic tire covers, a pair of mold halves are attached one to a top platen and the other to a bottom platen of a hydraulic press. A radially expansible rubber diaphragm forms an inner annular wall of a mold chamber and, in operation, the diaphragm is inflated into the interior of a tire cover located between the mold halves, when the mold and press are closed and provides molding pressure. When the mold is subsequently opened, the diaphragm resumes a substantially cylindrical shape and is then completely withdrawn clear of the molded cover by means of a vacuum applied to the interior surface of the diaphragm.

In order to maintain the mold halves completely closed during the molding operation, it is necessary to supply, by means of a hydraulic press, a large force to oppose the force set up by the pressure within the diaphragm chamber. Furthermore, it is necessary to provide means for maintaining the diaphragm in its extended form when the vacuum is applied thereto for the purpose described.

Our present invention provides apparatus for diaphragm molding of pneumatic tires or tire covers in which the force required for maintaining the mold halves completely closed is considerably reduced, when compared with the known apparatus, also in which the means for maintaining the diaphragm in its extended form is of a simple and effective construction.

According to our invention, apparatus for shaping the cylindrical diaphragm and molding the tire cover or tire comprises a pair of axially separable mold parts, means for moving and maintaining said mold parts together and for separating them, a pair of diaphragm supporting members locatable with and interposed between the said mold parts and movable towards one another and an annular radially expansible diaphragm located between the supporting members and attached fluid-tightly on each side thereto. The apparatus also comprises means for moving the supporting members apart, collapsible means for maintaining the supporting members in spaced-apart relationship and an annular sealing means fluid-tightly engageable with the supporting members so as to define between the supporting members and the diaphragm an annular fluid-tight chamber.

A single annular sealing means for withstanding both the molding pressure and the vacuum may be provided and may be attached to one of the supporting members and may be relatively slidable in fluid tight engagement with the other supporting member. Preferably, however, one sealing means is provided to withstand the vacuum and additional sealing means is attached to one of the supporting members and fluid-tightly engageable with the other supporting member when the said members are moved axially toward each other, this latter sealing means being provided to withstand the molding pressure.

Collapsible means are provided for maintaining the supporting members in spaced-apart relationship when vacuum is applied to the annular fluid-tight chamber and may, for example, take the form of a plurality of toggle mechanisms, automatically collapsible upon closure of the mold parts.

An embodiment of our invention is illustrated by way of example in the accompanying drawing which shows in cross-sectional elevation part of a two mold apparatus for shaping and molding pneumatic tire covers, each mold having a cylindrical diaphragm and one mold being shown in open position and the other in closed position with a tire cover to be molded in the open mold and a molded tire cover in the closed mold.

The apparatus of the drawing comprises a hydraulic press having upper and lower platens 1 and 2, respectively, and an intermediate platen 34. An upper half 3 of a tire mold is attached to the upper platen 1 and the lower half 4 of the mold is attached to the intermediate platen 34. Mold halves 5 and 6 are attached to the intermediate platen 34 and lower platen 2 respectively. The intermediate platen 34 is positioned between the upper and lower platens by guide pillars 8. In the fully open position of the press rods 7 retain the intermediate platen 34 midway between the upper and lower platens 1 and 2.

A hydraulic pressure supply line (not illustrated) is connected to the press and a supply line (also not illustrated) for curing steam is connected to annular chambers 9 formed in each of the mold halves.

Upper and lower annular supporting members 10 and 11 are interposed between each set of mold halves, the supporting members having telescoping cylindrical projections 12 and 13 extending axially therefrom, the innermost projection 12 having a recess 12a on its outer periphery which carries an annular seal 14 which is fluid-tightly slidable on the inner peripheral surface of the other projection 13. This seal is provided to withstand subatmospheric pressure or a vacuum as will be described later herein. The annular projections are retained in telescoping relationship by means of radially extending flanges, provided on the projections, which engage with each other when the supporting members are moved axially apart by a predetermined amount.

In respect of each mold, the sides of an annular, radially extensible, rubber diaphragm 15 are attached to the outer peripheries of the supporting members 10, 11; the supporting members, the axial projections 12, 13, the diaphragm 15 and the sealing means 14 defining a fluid-tight chamber 15a. A supply line (not illustrated) for curing steam is connected to the chamber and a vacuum connection (not illustrated) is also provided.

A second annular seal 16 is located in a recess 16a formed in the projection 13 on the lower supporting member 11, this seal being provided with an inclined annular extension 16b which engages with a correspondingly inclined surface 10a formed on the upper supporting member 10 when the said members are moved axially toward each other. (Note lower set of supporting members.)

Three exactly similar toggle mechanisms 17 of which only one is shown in the drawing are each located in equi-angularly spaced-apart relationship between the lower press platen 2 and the intermediate platen 34. Three similar mechanisms 17a are also provided between the upper platen 1 and the intermediate platen 34. For convenience, one mechanism only, associated with the lower set of supporting members, will be described. A lower link 18, forming part of the mechanism is pivotally attached to an upstanding lug 19 attached to the lower press platen, the lower link carrying an intermediate pivot pin 20 and having a cranked extension 21, the end of which, when the supporting members are located in the spaced-apart position as shown in the upper set, projects above the uppermost surface of the upper supporting member 10 and is provided with a roller 22 which is engageable with the intermediate platen 34 in order to effect collapsing of the toggle mechanism as will be later described.

An upper link 23, forming part of the toggle mechanism, has one end pivotally attached to a lug 24 attached to the upper supporting member 10 and is also pivoted on the intermediate pivot pin 20. The upper link is provided with a cranked extension 25 which, when the supporting members are located in the spaced-apart position, bears on an abutment formed by the upstanding lug 19 attached to the lower press platen 2 for the purpose to be described. The toggle mechanism associated with the upper set of supporting members shows this position.

An abutment in the form of a supporting pillar 26 is provided co-axially with the lower press platen and is provided with a lateral hole 27 for each toggle mechanism. Each toggle mechanism is provided with a toggle spring supporting rod 28, located in one of the holes, and pivotally mounted at its other end on the intermediate pivot pin 20. A coiled compression spring 29 is mounted co-axially on the rod and abuts a shoulder 30 formed adjacent to the pivot pin end of the rod and abuts a collar 31 provided adjacent to the other end of the rod which is slidable on the rod and bears against the pillar 26. The compression spring operates so as to urge the pivot-pin end of the rod away from the pillar and so as to urge the upper and lower links 23 and 18 into an over-center position as shown in the upper mechanism, the extent of the over-center movement being limited by the engagement of the cranked extension 25 formed on the upper link with the upstanding lug 19 attached to the lower press platen.

The operation of the apparatus is as follows:

Raw built-up tire covers 32 are located co-axially over the diaphragms 15 associated with each mold so that one bead of each cover rests in the bead molding portion of the corresponding lower mold half. Hydraulic pressure is supplied to the press so as to cause the lower press platen 2, carrying the lower mold half 6, to move towards the intermediate press platen 34 and mold half 5. As the mold halves 5 and 6 approach one another, the intermediate platen 34 engages with the rollers 22 formed on the toggle mechanisms 17. This causes a rotation of the lower link 18 about the pivot carried in the upstanding lug 19, relative movement of the lower and intermediate platens causing the toggle linkages to be moved from the over-center position so that they collapse. During the collapsing movement, the rollers on the toggle mechanisms 17 move clear of the intermediate platen, complete collapsing of the toggle mechanisms continuing by virtue of the contact of the intermediate platen 34 with the upper supporting member 10, the collapsing movement being transferred to the toggle mechanisms. Further movement of the lower press platen carries the intermediate platen 34 upwards until mold halves 3 and 4 are brought together in a similar manner to that described for mold halves 5 and 6.

When the supporting members 10, 11 of each mold are moved axially together, the seal 16 having the inclined annular projection 16b engages with the correspondingly inclined surface 10a so as to form a fluid-tight seal, a fluid-tight annular chamber 15a being defined by the supporting members 10, 11, the diaphragm 15 and the last-mentioned seal. A supply of curing steam is then fed to the annular chambers 15a through a connection provided so as to inflate the diaphragm under pressure against the inside of the uncured tire cover, curing steam also being supplied to the annular chambers 9.

In view of the fact that the whole of the space between the upper and lower platens 1 and 2 is not filled with curing steam but only the annular chamber 15a, the force set up by the steam and tending to separate the mold halves during cure is comparatively low. This allows for economy in the design of the hydraulic press, or the reduction of hydraulic pressures. When the cure is complete, the supply of steam to the chambers is cut off and the remaining steam exhausted. The press is then opened, and the compression springs 29 associated with the toggle mechanisms 17 cause the mechanisms to assume their original state with the rollers 22 provided on the lower links projecting above the upper supporting member.

In order fully to withdraw the diaphragms from the covers so that the covers may be easily withdrawn from the apparatus after cure, a vacuum is applied to the chambers 15a which are now made fluid-tight by means of the seals 14. The vacuum causes radially inward collapsing of the diaphragms 15 and the molded covers may then be removed. The supporting members 10, 11 are prevented from collapsing, when the vacuum is applied, by the toggle mechanisms 17 which, in their over-center position, are unable to collapse and therefore maintain the supporting means in the spaced-apart position.

Having described our invention, we claim:

1. Apparatus for diaphragm shaping and molding pneumatic tire covers comprising a pair of axially separable mold elements having complementary annular recesses to receive and mold the tire cover, means for moving said elements axially of said recesses to separated and closed positions, a pair of opposed annular diaphragm supporting members interposed between said mold elements adjacent and co-axial with the inner peripheries of said recesses and movable axially to and from each other, an annular, radially expansible, diaphragm located between said diaphragm supporting members and attached fluid-tightly at opposite ends to opposed members, a pair of fluid-tightly telescoping cylindrical walls coaxial with and of smaller radius than said annular diaphragm, one secured fluid-tightly to one diaphragm supporting member and the other secured fluid-tightly to the other diaphragm supporting member to complete with said diaphragm and supporting members an annular fluid-tight chamber within said diaphragm.

2. The apparatus of claim 1 having an annular sealing ring mounted on a peripheral surface of one of said telescoping walls in position to seal against a surface of the diaphragm supporting member opposite the one to which it is secured when said diaphragm supporting members are brought to closed position to divide said annular chamber into two concentric, fluid-tight, annular compartments.

3. The apparatus of claim 1 having an annular sealing ring mounted on the outer peripheral surface of the outer of said telescoping walls in position to seal against an inner surface of the diaphragm supporting member opposite the wall to which it is secured when said diaphragm supporting members are brought to closed position to divide said annular chamber into two concentric, fluid-tight, annular compartments.

4. The apparatus of claim 1 comprising in addition collapsible means for maintaining the supporting members in spaced-apart relationship, said collapsible means comprising a plurality of toggle mechanisms located in equi-angularly spaced relationship around and between the supporting members, each toggle mechanism comprising a pair of links connected together by means of a common pivot, each link being pivotally connected to a supporting member, means for urging each of the toggle mechanisms into the over-center position, means for supporting each of the toggle mechanisms in the over-center position, and means for collapsing each of the toggle mechanisms.

5. Apparatus according to claim 4 wherein the means for urging the toggle mechanisms into the over-center position comprises a compression spring for each mechanism connected at one end to the common pivot and at the other end to an abutment.

6. Apparatus according to claim 4 wherein the means for supporting each of the toggle mechanisms in the over-center position comprises an extension of one of the links which engages with an abutment when the mechanism is in the said position.

7. Apparatus according to claim 4 wherein the means for collapsing each of the mechanisms comprises an extension of one of the links which projects beyond one of the supporting members so as to be engageable with the means for moving the mold parts together in order to collapse the mechanism.

8. Apparatus according to claim 1 wherein the diaphragm supporting members comprise annuli mounted coaxially with the mold parts, the annuli being provided with telescoping axially extending flanges between which the annular sealing means is located.

9. Apparatus according to claim 3 wherein the annular sealing ring has a frusto-conical peripheral surface, a corresponding frusto-conical surface being provided on the other supporting member, the two frusto-conical surfaces coming into sealing engagement upon closure of the mold parts.

References Cited in the file of this patent

UNITED STATES PATENTS

| | | |
|---|---|---|
| 2,715,245 | Soderquist | Aug. 16, 1955 |
| 2,736,059 | Frank | Feb. 28, 1956 |
| 2,743,480 | Frank | May 1, 1956 |